W. W. PAGE.
Cover for Tea Kettles.
No. 70,461.
Patented Nov. 5, 1867.
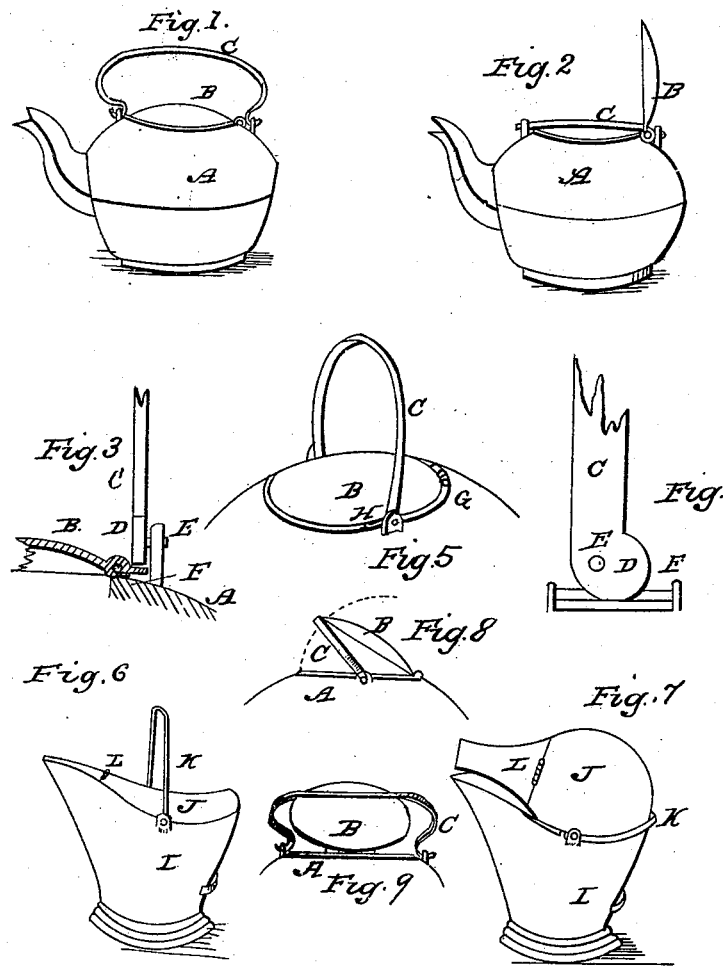

United States Patent Office.

WILLIAM W. PAGE, OF TROY, NEW YORK, ASSIGNOR TO ARNOLD H. HOLDRIDGE AND DANIEL E. PARIS, OF THE SAME PLACE.

Letters Patent No. 70,461, dated November 5, 1867.

IMPROVEMENT IN COVERS FOR TEA-KETTLES, &c.

*The Schedule referred to in these Letters Patent and making part of the same.*

TO ALL WHOM IT MAY CONCERN:

Be it known that I, WILLIAM W. PAGE, of the city of Troy, and State of New York, have invented new and useful Improvements in Covers for Tea-Kettles, and other such articles as have a bail and a cover within the curve of said bail, which invention I have duly assigned to Arnold H. Holdridge, and Daniel E. Paris; and I do hereby declare that the following is a full, clear, and exact description thereof, which will enable others skilled in the art to make and use the same, reference being had to the accompanying drawings, and to letters of reference marked thereon, like letters representing like parts.

Figure 1 represents a tea-kettle with cover and bail, the bail, standing upright and with the cover in its place. The bail will turn down to the right without moving the cover, but if turned down to the left the cam on said bail operating upon a prong on the cover will raise up the cover into a nearly perpendicular position, as seen in Figure 2, and then, as the bail is turned back, the cover being a little less than perpendicular, will fall back of itself into its place as soon as the bail reaches a perpendicular position again, as seen in fig. 1. The bail C, therefore, can be used when upright without disturbing the cover B, and it can be let down to the right also without disturbing the cover. The prong on the cover may be placed a little to the left of the pivot E, which will facilitate this operation.

Figure 3 shows the bail C and the cam D, the cover B, with the prong F on the cover, on which the cam D operates.

Figure 4 is a side view of the cam on the bail C. The pivot E may be placed below the prong F on the cover, so as to raise the cover by a sort of lever movement, in which case the cam need not be as large, may be nearly or quite omitted, but in either case the cam or end of the bail C should swell out a little to the inward, so as to operate on the prong F of the cover after the lower part or face of the cam or bail has raised the cover to its full extent; that is, this swell or bulge projecting inward from the side of the cam or bail, operating on the prong F after and immediately after the face of the cam or bail has performed its work, so that the cover may be still continued to rise to its proper position, or the prong on the cover may be enlarged upward, so as to do away with the inward projection or bulge on the inner side of the bail.

Figures 6 and 7 show how this invention may be applied to coal-hods, or any other articles having a cover situated within the curve of a bail.

Figures 5, 8, and 9 show a different device by which the cover may be raised by lifting it up by means of the bail C, when the cover is hung on another side of the vessel.

I do not claim a device to move the cover off its place and then on again horizontally, as shown in the application for a patent of Daniel E. Paris, but only the device to raise the cover upwards, as here shown and explained.

I only speak here of a bail made in the shape of a half circle, as shown in drawings, but a handle or lever will do the same work; that is, one half of the bail here described will do the work, as only one end of it is needed, and this half bail or handle may be of any desired form or shape needed or best adapted for the vessel to which it is attached.

Having thus described my invention, what I claim, and desire to secure by Letters Patent, is—

A bail and cover combined to vessels or kettles, constructed with a cam or bulge at or near one end of the bail, so that it will operate on an arm, or on one end of the cover, to raise it upward and let it down as the bail is shifted from side to side, when constructed substantially as herein described and set forth.

WM. W. PAGE.

Witnesses:
 LEWIS POTTER,
 MARIA W. PAGE.